July 26, 1966 F. W. BRADY ETAL 3,262,632

RECLOSEABLE FASTENER

Filed Sept. 17, 1964 4 Sheets-Sheet 1

INVENTORS
FREDERICK W. BRADY
EDMUND A. FERRIS
BY
Arthur H. Seidel
ATTORNEY

RECLOSEABLE FASTENER

Filed Sept. 17, 1964 4 Sheets-Sheet 2

INVENTORS
FREDERICK W. BRADY
EDMUND A. FERRIS
BY
Arthur H. Seidel
ATTORNEY

RECLOSEABLE FASTENER

Filed Sept. 17, 1964 4 Sheets-Sheet 3

INVENTORS
FREDERICK W. BRADY
EDMUND A. FERRIS
BY
Arthur H. Seidel
ATTORNEY

July 26, 1966 F. W. BRADY ETAL 3,262,632

RECLOSEABLE FASTENER

Filed Sept. 17, 1964 4 Sheets-Sheet 4

INVENTORS
FREDERICK W. BRADY
EDMUND A. FERRIS

BY Arthur H. Seidel

ATTORNEY

United States Patent Office 3,262,632

Patented July 26, 1966

3,262,632

RECLOSEABLE FASTENER

Frederick W. Brady and Edmund A. Ferris, Chippewa Falls, Wis., assignors of twenty-four one-hundredths to Lester S. Clemons, Milwaukee, Wis., twenty-four one-hundredths to Richard R. Teschner, Mequon, Wis., and four one-hundredths to Arthur H. Seidel, Milwaukee, Wis.

Filed Sept. 17, 1964, Ser. No. 397,223
12 Claims. (Cl. 229—51)

Figure 1:
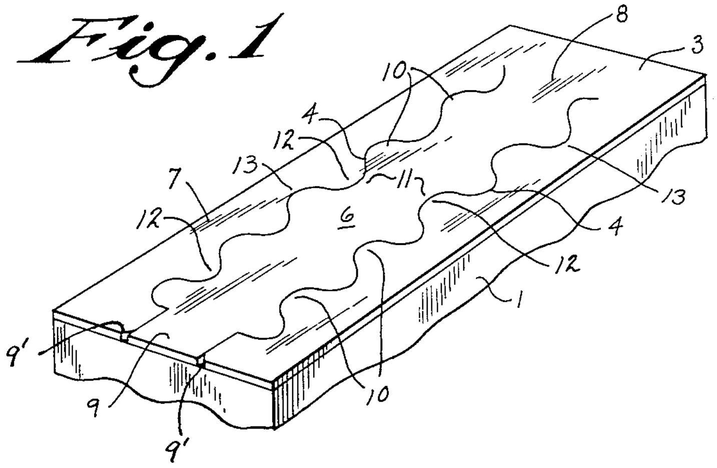

This invention relates to recloesable fasteners and it more specifically resides in a fastener having two members positioned alongside one another in which at least one member has an undulating edge comprising projections and recessions that interfits with the edge of the other member, and at the position of the projections one of the members is beveled, or undercut, whereby the edge of one member can be caught and retained beneath the edge of the other member.

Fasteners of the present invention can be utilized in diverse applications, and one such application constitutes a recloseable closure for a container that is opened and reclosed frequently. The cover of the closure is a flat flexible strip that can be simply opened by lifting a tab at one end and peeling it upward and backward to expose the interior of the container. It may then be reclosed by simply pressing it back in place with an accompanying snap engagement along its edges with a surrounding border member to form an interlocking fit. The cover is thus held closed and effectively resealed. To accomplish this provision of a cover that can be reclosed by simply pressing into position, a novel undulating edge is formed in both the cover member and the border member with which it fastens. The undulations provide a spaced series of projections on both the cover member and the border member which mate with corresponding recessions in the other member. By beveling the edges of the projections or recessions of at least one member and providing a resilient material the cover can be snapped into engagement with the border member along a succession of spaced points along its edge and resiliently held in place by the mating portion of the other member. This unique spaced snap like fit between members enables one to easily press the cover into closed position.

In one particular form, the closure may comprise a pliable sheet of non-fibrous synthetic material such as polyethylene. This sheet has cuts in the surface that substantially penetrate the sheet, but do not completely sever it. These cuts define a cover and a surrounding border member, and they also define a starting tab which may be grasped to peel the cover back from the surrounding border member by a severance along the cuts. A characteristic of a non-fibrous synthetic is that a cut, or score mark, will constitute a definite tear line, such that upon application of a force normal to the surface of the sheet it will separate, one part from the other, along such cut. In the present invention such cuts are preferably formed at a bevel and with an undulating geometry, so that when the starting tab is raised to free the cover and expose the interior of the container the cover and border portion will be recloseable by merely pressing the cover back into its original position. Thus, a closure is had which initially may be air tight, and which provides a highly desirable subsequent seal upon repeated reclosure. This closure is formed from inexpensive sheet material that does not materially increase the expense of the container of which it is a part.

The invention will also find application in other forms. For example, the cover of the foregoing discussion may be a completely separate center piece that may bear identifying indicia or other printed information. The center piece may be removed and others substituted, so that a label is had which can be changed and replaced. Shelf-markers, price markers, bin markers and similar labeling is thus available in which the marking indicia can readily be changed to reflect changes in price, etc., and the markers are held in firm position.

It is an object of this invention to provide a fastener in which two mating parts can be quickly and easily separated and refastened.

It is another object of this invention to provide a fastener of pliable sheet material of thin stock whereby the thickness of the fastener is no greater than the normal wall of a package.

It is another object of this invention to provide a fastener that can function as a closure for a variety of containers.

It is another object of this invention to provide a closure for a container that has an initial hermetic seal and which can be quickly opened and easily replaced by a simple pressing operation that produces a seal that prohibits spilling of solid materials and splash spilling of liquids.

It is another object of this invention to provide a fastener with no moving parts, as in a slide type fastener, but in which edges of portions to be engaged are resilient and comprise a series of projections that snap into engaging position upon the application of relatively light pressure.

It is another object of this invention to provide a fastener that may function as a clasp comprised of a simple arrangement of two sheet like members that interlock along mating edges which comprise a series of dovetails having beveled edges.

The foregoing and other objects and advantages of this invention will appear from the description to follow. In the description reference is made to the accompanying drawings which form a part thereof and in which there is shown by way of illustration several specific embodiments of the invention. These embodiments will be discussed in sufficient detail to enable those skilled in the art to practice the invention, and the invention may also reside in other embodiments and various modifications and rearrangements as may occur to one in the art. Consequently, the following detailed description is not to be taken in a limiting sense; instead the scope of the invention is best defined by the claims appearing at the end of this specification.

Figure 2:
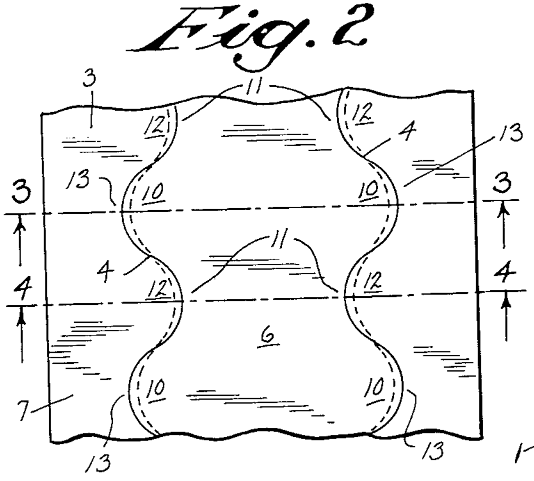
Figure 3:
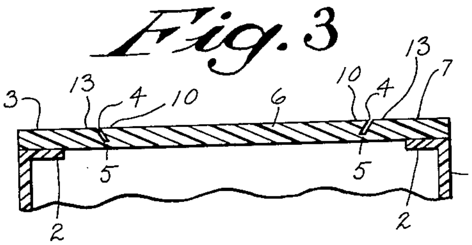
Figure 4:
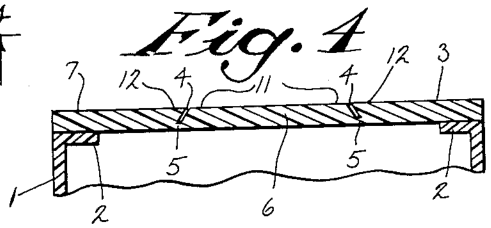
Figure 5:
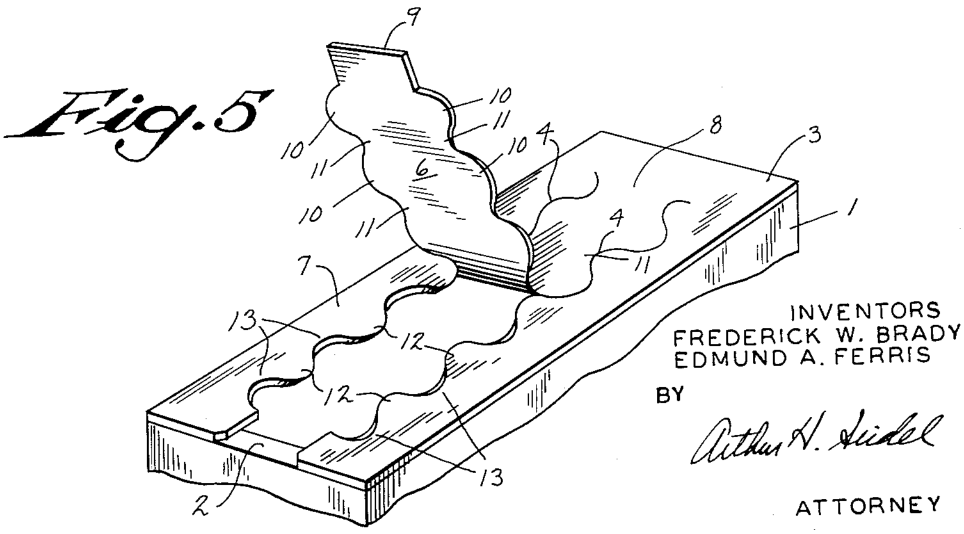
Figure 6:
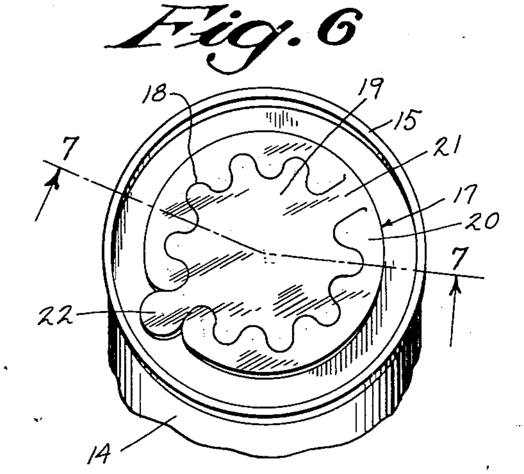
Figure 7:
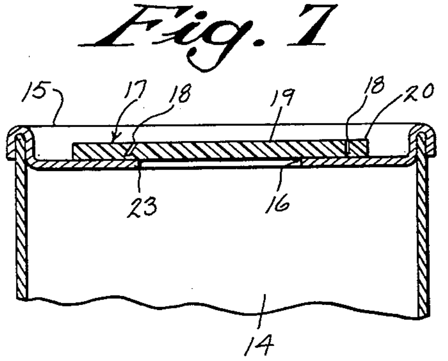
Figure 8:
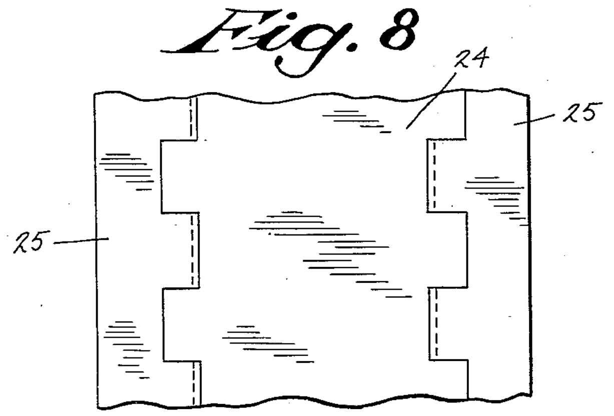
Figure 9:
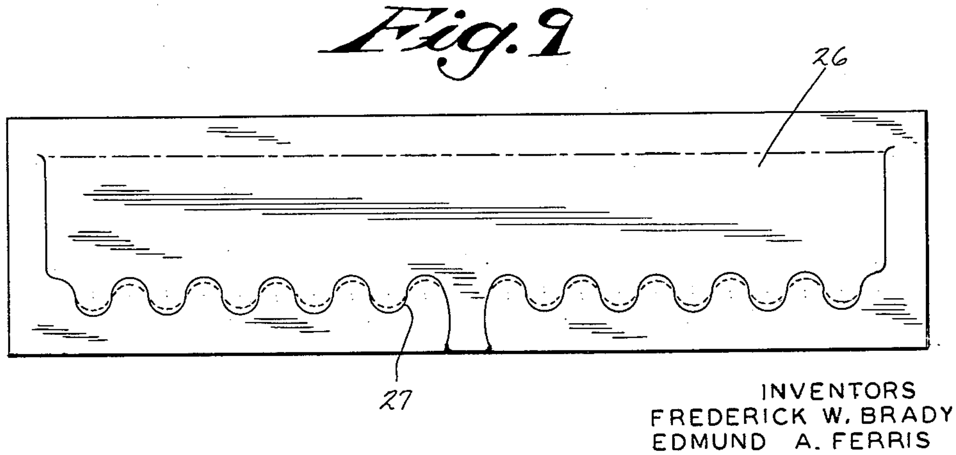
Figure 10:
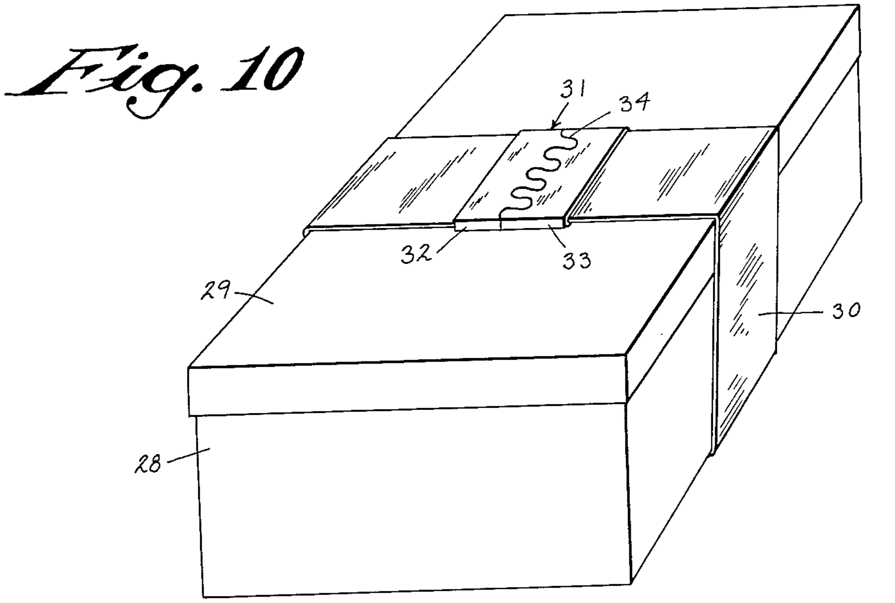
Figure 11:
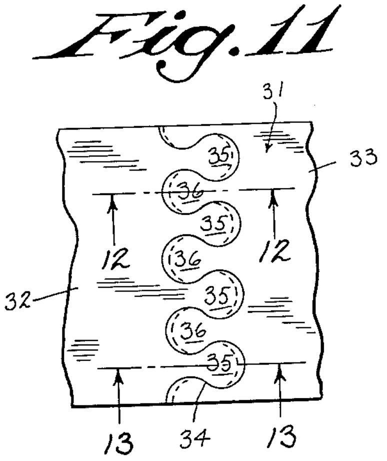
Figure 12:
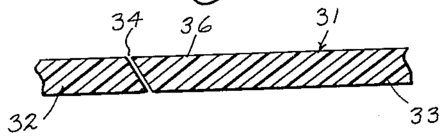
Figure 13:
Figure 14:
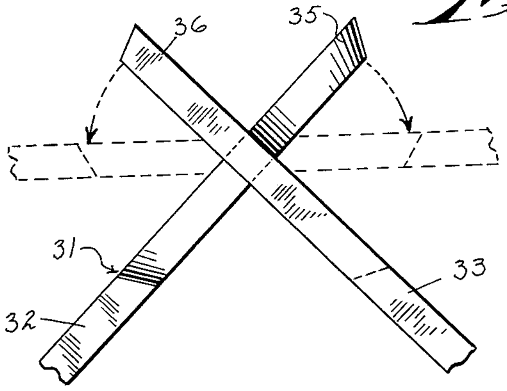
Figure 15:
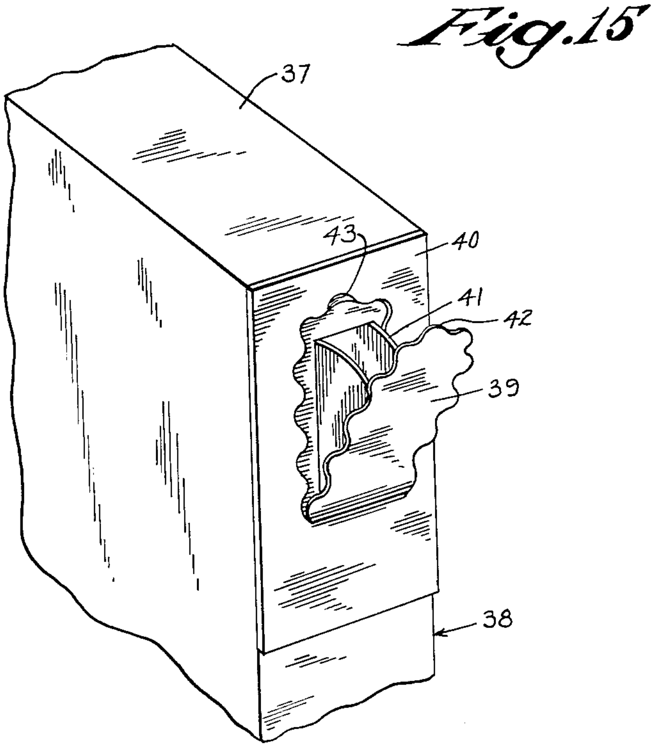
Figure 16:
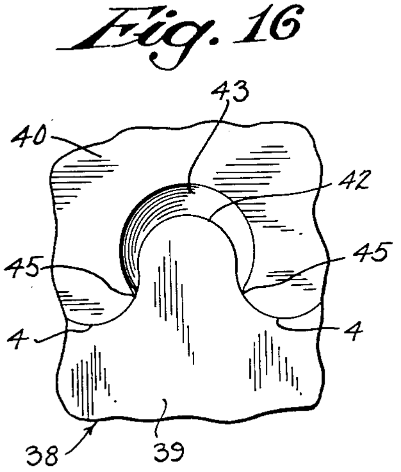
Figure 17:
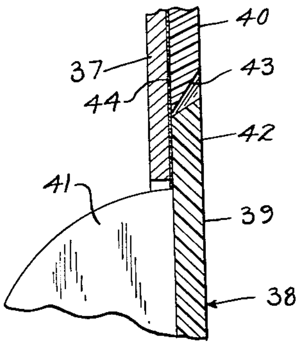

In the drawings:

FIG. 1 is a view in perspective of a top of a container having a closure comprised of the fastener of the invention, FIG. 2 is a top view of a fragmentary portion of the container of FIG. 1, FIG. 3 is a view in cross section of the container as viewed through the plane 3—3 indicated in FIG. 2, FIG. 4 is a view in cross section of the container as viewed through the plane 4—4 indicated in FIG. 2, FIG. 5 is another perspective view of the top of the container shown in FIG. 1, but with the cover member partially opened, FIG. 6 is a view in perspective of the upper portion of another container having a closure embodying the invention, FIG. 7 is a view in cross section of the upper part of the container of FIG. 6 as viewed through the plane 7—7 indicated in FIG. 6, FIG. 8 is a fragmentary top view of another form of fastener embodying the invention, FIG. 9 is a top view of another form of the invention, which form again constitutes a closure for a container, FIG. 10 is a view in perspective of a box in which the lid is held in place by a belt that includes a clasp embody the fastener of the invention, FIG. 11 is a fragmentary top view of the clasp of FIG. 10, FIG. 12 is a view in cross section of a portion of the clasp as viewed through the plane 12—12 indicated in FIG. 11, FIG. 13 is a view in cross section of the clasp as viewed through the plane 13—13 indicated in FIG. 11, FIG. 14 is a fragmentary side view of the clasp showing the manner in which the engageable members of the clasp are brought into engagement or separated from one another, FIG. 15 is a fragmentary view of the upper corner of a package including another form of the invention in which a pouring spout is associated with a cover member and a particular form of starter tab is employed, FIG. 16 is a fragmentary view of the exterior of the embodiment of FIG. 15 with the cover member in its initial closed position, and FIG. 17 is a view in section of the structure of FIG. 16.

Referring now to the embodiment shown in FIGS. 1–5, there is a container body 1 having four side walls, and as shown in FIGS. 3, 4 and 5 the upper margins of the side walls are turned inward to form a flanged rim 2. Fastened tightly upon the rim 2, by a suitable adhesive or any other satisfactory means of attachment, is a top 3 that constitutes a closure embodying the invention. The top 3 constitutes a sheet that is preferably of non-fibrous material, and a polyethylene is very satisfactory as well as other synthetic materials. For usual applications the material of the top 3 should have a resilient property permitting snapping of parts into place, and it should be non-fibrous to the extent that it will readily sever along a score mark, rather than to tear along a natural grain or along fibers of the material which extend counter to any score mark. In the top 3 there are formed two spaced cuts, or score marks, 4 that penetrate substantially the entire thickness of the top 3. They do not, however, fully penetrate, and thus there remains a thin web 5 at the base of each cut 4. Hence, when the container 1 is initially closed by placing the top 3 upon the rim 2 it is tightly sealed around its entire surface.

The two cuts 4 each extend longitudinally along the top 3 to define a cover member 6 that lies between the cuts 4. To the outside of the cover 6 is a border member 7 which together with the cover forms the closure of the invention. One end 8 of the cover 6 merges with the border member 7, to have a hinge like connection between the two members 6 and 7. The other end of the cover 6 is in the form of a starting tab 9 which may be grasped and pulled upward to peel back the cover 6 in the manner shown in FIG. 5. At the outer end of the tab 9 are triangular cuts 9' in the top 3 that extend through the entire thickness of the top, as distinguished from the partial penetrations of the cuts 4.

Each of the cuts 4 has an undulating geometry that defines a succession of projections 10 along each edge of the cover 6, and between the projections 10 there are complementary recessions 11. Since the border member 7 is formed by the same cuts 4 as the cover 6, it likewise has along each of its edges a series of projections 12 and recessions 13, which match and mate with those of the cover 6. In the particular form of FIGS. 1–5 the projections and recessions are in the form of a series of circle segments or scallops, but they may also take the form of other geometries, such as triangular or square configurations.

Whatever may be the precise geometric forms of the projections and recessions, the cuts 4 are formed at a bevel along at least a portion of their lengths. This bevel, which may be described as an oblique or slanting cut with respect to the surface of the top 3, is clearly shown in FIGS. 2–4. Where the projections 10 of the cover 6 fit into and mate with a complementary recession 13 of the border member 7 the cuts 4 are at an angle to the surface of the top 3 that is downward and inward. This angularity is shown in FIG. 3, and also by the dotted line representation in FIG. 2. Hence, the edges of the projections 10 of the cover 6 will overlie the mating edges of the recessions 13 of the border member 7.

Along the recessions 11 of the cover 6 the cuts 4 are at a bevel which slants downwardly and outward, as shown in FIG. 4 and in the dotted line representation of FIG. 2. Thus, where the projections 12 of the border member 7 mate with the recessions 11 of the cover 6 the edge of the cover 6 underlies the edge of the projections 12 of the border member 7.

When the container is first used the starting tab 9 is grasped, as previously stated, and by a modest application of pulling force the cover 6 is peeled back as shown in FIG. 5. The webs 5 readily sever, and the severance will slavishly occur along the cuts 4, as this is a characteristic property of a polyethylene and other materials that can be selected for the top 3. When it is desired to reclose the container 1 the cover 6 is lowered, and by a simple, light pressing motion starting at the hinge end 8 and advancing toward the tab 9 the spaced recessions 11 of the cover 6 will snap under the projections 12 of the border member 7 by reason of the resilient character of the top 3. Thus, by virtue of the bevels of the cuts 4 the cover 6 will be retained in place. The downward and inward bevel along the projections 10 of the cover 6 restrain the cover 6 from being pressed into the container 1, and the downward and outward bevel of the cuts 4 along the projections 12 of the border member 7 restrain the cover 6 from opening. It has been found that by making the cuts 4 of minimal width that the cover 6 can be held firmly in place. The container 1 is ideal for powders and granular materials, and by careful formation of the cuts 4 liquids can also be contained without fear of splash-spilling. The seal that is obtained upon reclosing also blocks air movement, so that except for goods that are highly perishable through contact with air the closure is extremely satisfactory. Further, the container 1 can be opened and reclosed repeatedly without any adverse effect upon the locking engagement of the mating recessions and projections.

Referring now to FIGS. 6 and 7, there is shown the upper portion of a circular cylindrical container 14 capped by a stamped metal top 15 having a central opening 16. Secured to the upper surface of the top 15 is a closure 17 of the invention. Similarly as the top 3 of FIGS. 1–5, the closure 17 is of thin sheet material having resilient properties and preferably of non-fibrous character. A pair of cuts 18 are formed in the closure 17, and it is seen that they are of undulating character similar as in FIGS. 1–5, to thereby form a central cover 19 and a border member 20. The cover 19 has a hinge 21 and a starting tab 22.

The particular closure 17 of FIGS. 6–7 differs from that in FIGS. 1–5 primarily in that the cuts 18 are not beveled along their entire length and the top 15 presents a ledge 23 encircling the opening 16 upon which the edge margin of the cover 19 rests. With respect to the bevel, the cuts 18 are beveled in the recessions of the cover 19, as shown in FIG. 7, and this bevel is downward and outward. At the projections of the cover 19 the cuts 18 may be vertical, and in this form of the invention when the cover 19 is press-snapped into closed position the edges along the recessions of the cover 19 will snap under the projections of the border member 20 and thus be held captive between the ledge 23 and the border member 20. If desired, a reverse bevel may be employed along the projections of the cover 19, but this normally is not necessary when the closure 17 has a ledge 23 functioning as a stop along its underside.

FIG. 8 shows a variation in the undulating geometry of the edges of a cover member 24 and border members 25. As discussed hereinabove undulations may take the form of different geometries, but in the various examples described and shown a characteristic is a repeated succession of projections and recessions whereby upon reclosing the cover a series of spaced snap engagements occur in which the projections of one of the members will be snapped, by a momentary resilient deformation, into a locked engagement with the recessions of the other member.

FIG. 9 shows a further alternative form in which a cover member 26 is formed by a cut 27 extending along one edge only of the cover. The mode of operation of this embodiment is similar to that described for the foregoing embodiments. Those in the art will readily appreciate that a variety of forms of the fastener of the invention may be devised. Further, the invention need not be employed merely as a closure for containers, but may find other applications. For example, what has been described as a cover member may be completely removable, and a number of such members may be employed with a single border member. The cover members can then function as labeling or price markers in such places as grocery stores, gasoline stations or other establishments. Another example of an alternative form of the invention is the molding of the border member as a unitary part of a container or other object. It could be rigid, such as a molded glass, and the cover member could be a separate resilient piece of flat sheet material.

A specific example wherein the fastener of the invention is not a closure is presented in FIGS. 10–14. A box-like container 28 is shown in FIG. 10 with a lid 29 that is held in place by a belt 30 having a clasp 31 incorporating the invention. The belt 30 is of resilient material, so that it tightly conforms around the outer extent of the container 28 to resiliently hold the lid 29 in place. The clasp 31 comprises a pair of oppositely facing sheet like members 32 and 33 that are each secured along one edge to the elastic belt 30 and at its opposite edge with the other member. The members 32 and 33 are stiff and non-resilient, and may be formed of any suitable hard material. As more particularly shown in FIG. 11, they each have an undulating edge defined by a line of cleavage 34. The projections 35 of the member 32 and the projections 36 of the member 33 are both dovetailed, in that they have a head portion wider than a neck portion whereby the members 32, 33 will not part from one another when a force is applied in the direction of the belt 30. The complementary recessions of each member 32, 33 match and mate with the projections of the opposing member 32, 33, as in other forms of the invention.

The line of cleavage 34 is beveled, with the angle of inclination for the bevel changing from the projections of one member to the projections of the other member. Thus, for the projections 36 of the member 33 the bevel is in one direction, as shown in FIG. 12, and for the projections 35 of the member 32 the bevel of the line of cleavage 34 is in the opposite direction, as shown in FIG. 13. In this fashion, when the members 32, 33 are clasped together forces normal to the surfaces of the members 32, 33 will not dislodge them from their interconnection with one another. To separate the members 32, 33 or conversely to join them together, they are placed at an angle of about 90° as shown in FIG. 14. Then, the heads of the dovetail projections can be inserted between the narrow neck portions of the other member, and in the case of reclosing when the members 32, 33 are straightened they will be interlocked and fastened with one another.

A still further embodiment of the invention is shown in FIGS. 15–17, where the top corner of a package 37 is shown with an adhesively attached overlay 38 that constitutes a cover member 39 and a border member 40. The cover member 39 has a spout 41 on its inner side which is pulled out when the cover is opened, and a particular feature of this embodiment is that the starting tab 42 is similar to other projections of the cover. As seen in FIGS. 16 and 17 a recession 43 in the border member 40 is larger than the tab 42, to enable a person to place a fingernail under the tab 42 to open the package. The area of adhesive attachment of the overlay 38 is shown by the succession of dots 44 in FIG. 17, and it is seen that the tip of the tab 42 is free, so that it may be lifted to start an opening motion. Cut lines 4, of partial penetration commence at points 45 where the tab 42 meets the recession 43, so that the package 37 is hermetically sealed before opening.

The invention provides a clasp of diverse application. As a closure for containers a few uses can be catalogued here: refrigerator dishes, cans for powders and granular materials, pill boxes and dispensers, sandwich boxes, fishing bait containers and a multitude of other uses. Such closures for containers, and other forms of fasteners of the invention, have a series of spaced snap engagements along the coextensive lengths of two mating members. This is accomplished by providing a succession of projections along at least one member and undercutting or beveling the edge of one member at the position of the projections to achieve a snap type of interfit, whereby the engagement holds the members together. While beveled edges are shown in the illustrations, an undercut or stepped edge can also be employed, and the terms bevel and undercut are intended to encompass one another and equivalent edge treatments. A very marked accomplishment of this invention is a clasp of thin, pliable sheet material that is formed by cuts in the sheet. A simple construction results which can be inexpensively applied in many applications.

We claim:

1. In a closure for a container the combination of: a border member with spaced opposing edges that define an opening for the container, each edge having an undulating geometry that provides projections and recessions about said opening, and said border member also having a ledge beneath the edges which juts into said opening a short distance beyond the edges; a replaceable cover member of pliable sheet material that mates snugly with the edges of said border member and having undulating edges which have projections and recessions matching those of said border member; the projections of one member having inward and downward bevels and the projections of the other member having outward and downward bevels; and the recessions of each member having bevels that match those of the projections of the other member with which they mate, whereby outward and downward beveled edges on said cover member can be snapped past the mating edges of the border member and held between said ledge and the beveled edging of the border member.

2. In a closure for a container the combination of: a border member with spaced opposing edges that define an opening for the container, each edge having an undulating geometry that provides projections and recessions about said opening, and said border member also having a ledge beneath the edges which juts into said opening a short distance beyond the edges; a replaceable cover member having undulating edges which have projections and recessions matching those of said border member; the projections of one member having a beveled edge; and the recessions of the other member having matching bevels, whereby beveled edges on said cover member can be snapped past the edges of the border member and held between said ledge and the beveled edging of the border member.

3. In a closure for a container the combination of: a border member with an edge having an undulating geometry that provides projections and recessions, said border member also having a ledge beneath said edge which juts beyond the same a short distance; a replaceable cover member that mates with the edge of said border member and has an undulating edge which has projections and recessions matching those of said border member; the projections of one member having beveled edges; and the recessions of the other member having bevels that match those of the projections, whereby beveled edges on said cover member can be snapped past the beveled edges of the border member and held between said ledge and the beveled edging of the border member.

4. In a clasp the combination of: two oppositely facing sheet like members, each member having an undulating edge with dovetail projections that each comprise a narrow neck portion and a head portion wider than the neck portion and with recessions between the dovetail projections which match the dovetail projections of the opposite sheet like member; and the projections of both members having a bevel at their edges which is inclined toward the bevel of the projections of the other member, and the recessions of both members having bevels that mate with the projections that they match to have the beveled edges of the projections of each member overlying the matching bevel edges of the recessions of the other member when the members are in coplanar position; whereby the members may be clasped to one another or separated from one another by disposing them at approximately normal inclination to one another and translating the head portion of the dovetail projections of each member past the narrow neck portions of the other member.

5. In a clasp the combination of: two oppositely facing flat members, each member having an undulating edge with dovetail projections that each comprise a narrow neck portion and a head portion wider than the neck portion and with recessions between the dovetail projections which match the dovetail projections of the opposite member; and the projections of at least one having a bevel which is inclined to the surface of the members, and the recessions of the other member having matching bevels to have the beveled projections of the one member overlying the matching bevels of the matching recessions of the other member when the members are in coplanar position; whereby the members may be clasped to one another or separated from one another by disposing them at approximately normal to one another and translating the head portion of the dovetail projections of each member past the narrow neck portions of the other member.

6. In a closure the combination comprising:

a border member of thin sheet material with spaced opposing edges formed in such sheet material that define an opening, each edge having an undulating geometry that provides projections and recessions about said opening when viewed in a direction normal to the plane of the sheet material;

a cover member of thin sheet material having undulating edges formed in such sheet material that provide projections and recessions, as viewed in a direction normal to the plane of the sheet material, that mate snugly with the projections and recessions of said border member when the cover member is in coplanar registry with the border member;

the projections of the edges of one member being beveled at an angle to the plane of the sheet material forming the member;

the recessions of the edges of the other member being beveled to match those of the said one member, whereby the beveled edges of the border member overlie edges of the cover member when said members are in coplanar relation; and the beveled edges of at least one member being resilient to snap past the edges of the other member as they are moved relative to one another in a direction normal thereto.

7. A closure as in claim 6, wherein the undulating edges of both said border member and said cover member are formed by a cut in thin sheet material forming the border and cover members.

8. A closure as in claim 7, wherein the cut partially penetrates the thin sheet material to form a thin web between the border and cover members which severs upon movement of the cover member from a coplanar relation.

9. A closure as in claim 6, wherein said border and cover members are of a non-fibrous material.

10. A closure as in claim 6, wherein the projections of the edges of one member have inward and downward bevels and the projections of the other member have outward and downward bevels, and the recessions of each member have bevels that match those of the projections of the other member with which they mate.

11. In a closure the combination comprising:

a border member with an edge of undulating geometry that defines projections and recessions when viewed in a direction normal to the plane of the edge;

a cover member having an undulating edge that defines projections and recessions that mate snugly with the projections and recessions of said border member when the edges of the two members are in coplanar registry with one another;

at least one of said members being a thin sheet of flexible material that is resilient along its edge;

the projections of the edge of one member being beveled at an angle to the plane of the edge;

the recessions of the edge of the other member being beveled to an angle matching the bevel of the edge of said one member, whereby the beveled edge of the border member overlies the edge of the cover member when said edges are in coplanar relation; and said resilient edge of said one member being adapted to snap past the edge of the other member as the members are moved relative to one another in a direction normal to the edge planes thereof.

12. A closure as in claim 11, wherein both the border and cover member is of a thin sheet, and the edges of both are formed by a cut in the thin sheet that partially penetrates the sheet to form a thin web which severs upon movement of the cover member from a coplanar relation.

References Cited by the Examiner

UNITED STATES PATENTS

| | | | |
|---|---|---|---|
| 67,022 | 7/1867 | Carrier | 229—6 |
| 981,993 | 1/1911 | Gair et al. | 229—48 X |
| 1,719,617 | 7/1929 | Novick. | |
| 1,892,594 | 12/1932 | Stone | 229—35 |
| 2,048,544 | 7/1936 | Fritz. | |
| 2,841,850 | 7/1958 | Zahorski. | |

JOSEPH R. LECLAIR, *Primary Examiner.*

FRANKLIN T. GARRETT, *Examiner.*

D. M. BOCKENEK, *Assistant Examiner.*